(No Model.)  2 Sheets—Sheet 1.

S. H. KOBLE.
GRAIN DRILL.

No. 304,830.  Patented Sept. 9, 1884.

WITNESSES:
Chas. Nida
C. Sedgwick

INVENTOR:
S. H. Koble
BY Munn & Co.
ATTORNEYS.

(No Model.) 2 Sheets—Sheet 2.

S. H. KOBLE.
GRAIN DRILL.

No. 304,830. Patented Sept. 9, 1884.

WITNESSES:
Chas Nida
C. Sedgwick

INVENTOR:
S. H. Koble
BY Munn & Co
ATTORNEYS.

UNITED STATES PATENT OFFICE.

SAMUEL HOWARD KOBLE, OF HICKMAN MILLS, MISSOURI.

GRAIN-DRILL.

SPECIFICATION forming part of Letters Patent No. 304,830, dated September 9, 1884.

Application filed March 28, 1884. (No model.)

*To all whom it may concern:*

Be it known that I, SAMUEL HOWARD KOBLE, of Hickman Mills, in the county of Jackson and State of Missouri, have invented certain new and useful Improvements in Grain-Drills, of which the following is a full, clear, and exact description.

Reference is to be had to the accompanying drawings, forming part of this specification, in which similar letters of reference indicate corresponding parts in all the figures.

Figure 1:
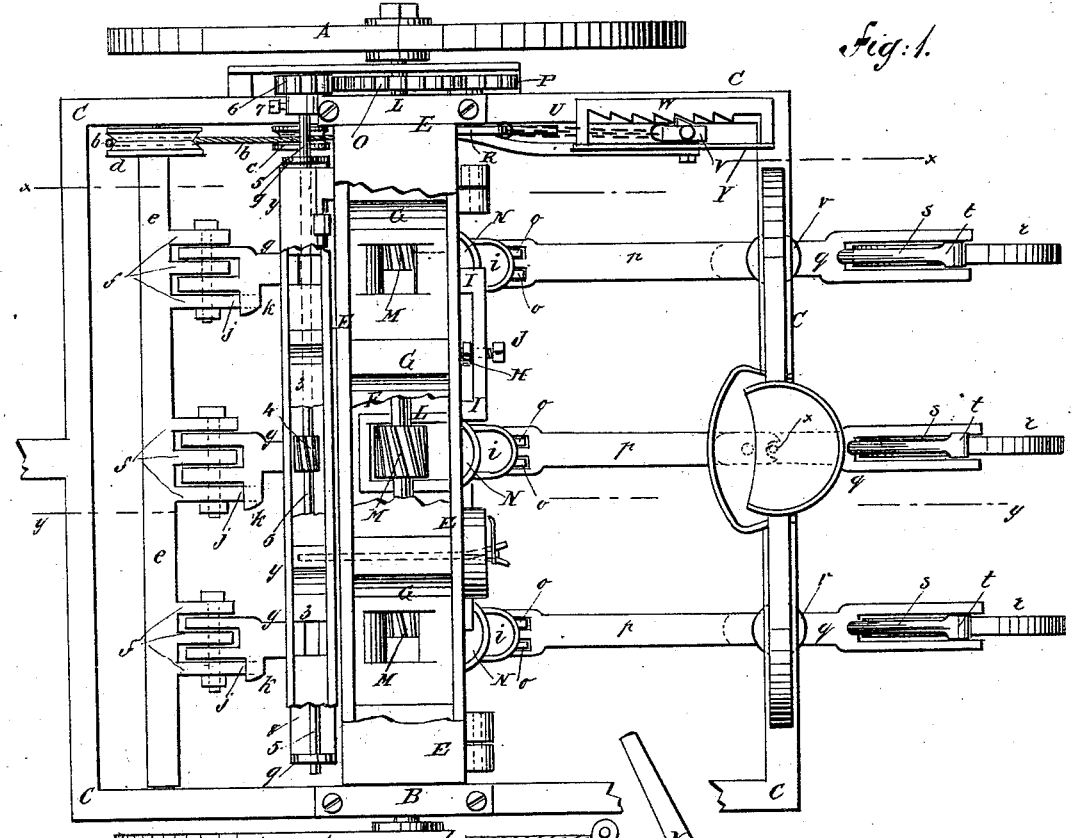
Figure 2:
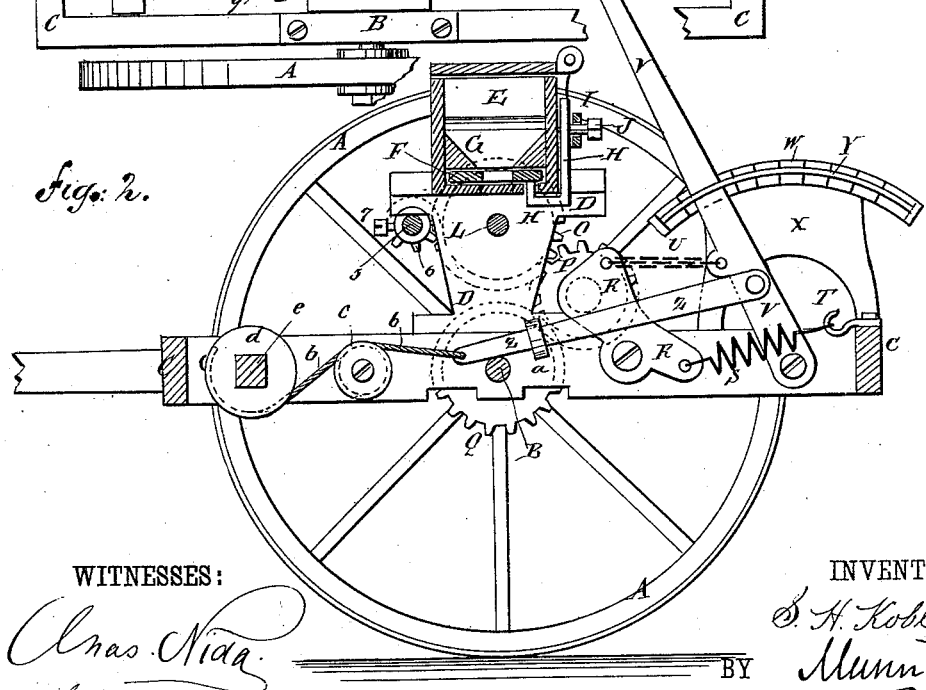
Figure 3:
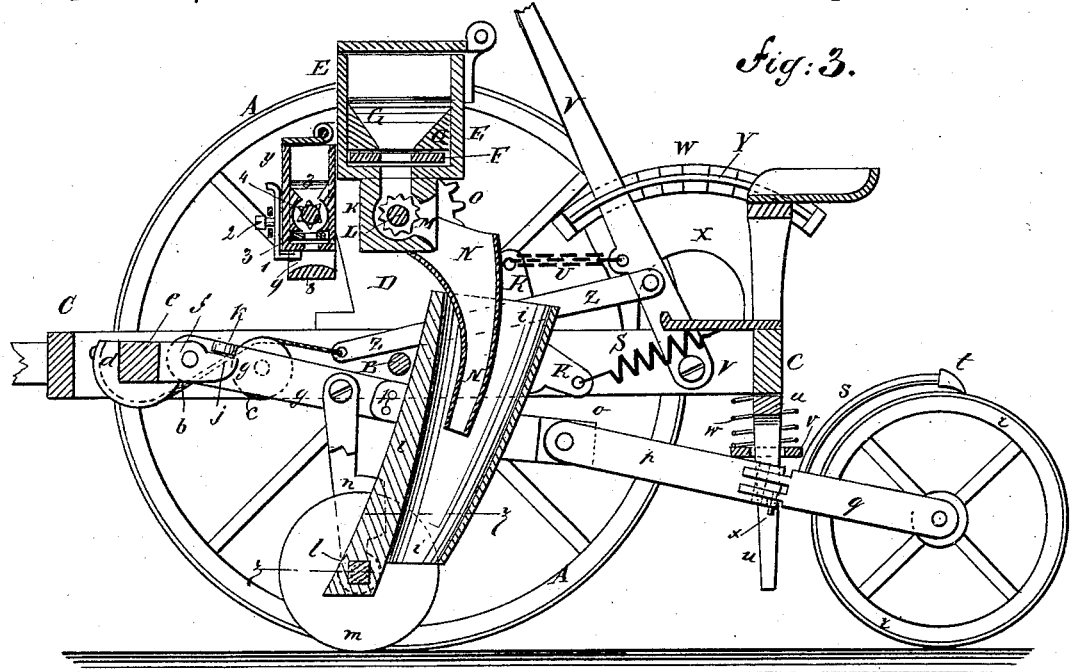
Figure 4:
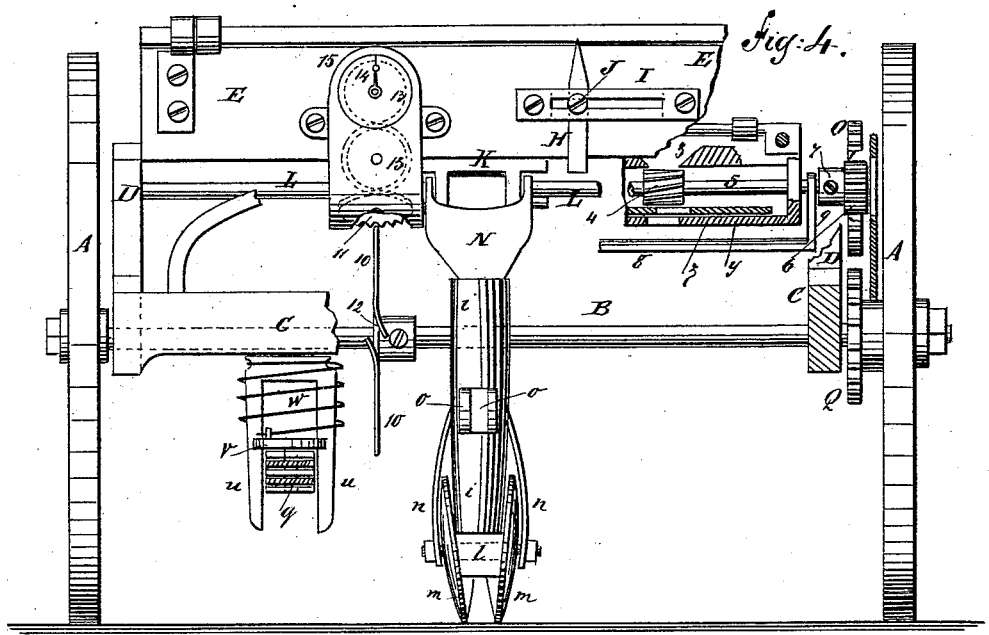
Figure 5:
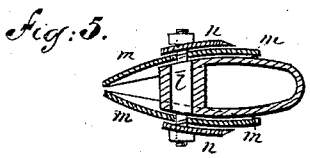

Figure 1, Sheet 1, is a plan view of my improvement, parts being broken away. Fig. 2, Sheet 1, is a sectional side elevation of the same, taken through the line $x\ x$, Fig. 1. Fig. 3, Sheet 2, is a sectional side elevation of the same, taken through the line $y\ y$, Fig 1. Fig. 4, Sheet 2, is a rear elevation of the same, parts being removed and parts being broken away. Fig. 5, Sheet 2, is a sectional plan view of a boot and its furrowing-wheels, taken through the line $z\ z$, Fig. 3.

The object of this invention is to promote convenience in operating and controlling grain-drills, and also to secure uniformity in the distribution of seed by such drills.

The invention consists in the construction and arrangement of parts, as will be first described, and then specifically set forth in the claims.

A are the wheels, one of which is loose and the other is rigidly attached to the axle B, so as to carry the said axle with it in its revolution. The axle B revolves in bearings attached to the middle parts of the side bars of the frame C. To the middle parts of the side bars of the frame C are bolted the lower ends of standards D, to the upper ends of which are bolted the projecting ends of the bottom of the seed-box E. In the bottom of the seed-box E are formed eight (more or less) openings for the escape of seed.

Upon the bottom of the seed-box E is placed a bottom, F, having openings corresponding in number, shape, size, and position with the openings in the seed-box bottom. The bottom F is made shorter than the seed-box, so that it can have a longitudinal movement, so that it can be adjusted to partly or wholly close the discharge-openings, and thus control the escape of seed.

Above the sliding bottom F is placed a bottom, G, having openings corresponding in number, shape, size, and position with the openings in the bottom of the seed-box E. The upper side of the bottom G is provided around its openings with hopper-shaped recesses to guide the seed into the discharge-openings in the said bottom.

H is a U-shaped bar, made with unequal arms. The short arm of the bar H passes up through a slot in the bottom of the grain-box E, and is attached to the sliding bottom F, so that the said bottom can be adjusted by moving the said bar H. The long arm of the bar H passes up at the rear side of the seed-box E, passes through a long keeper, I, attached to the said seed-box, and is provided with a set-screw, J, for fastening the said bar H and the sliding bottom F in any position into which they may be adjusted.

To the bottom of the seed-box E is attached the feed-box K, through which passes the feed-shaft L.

To the shaft L, within the feed-box K, directly below the opening in the bottom of the seed-box E, are attached feed-cylinders M, to receive the seed from the said seed-box E and convey it to the flexible discharge-spouts N, attached to the said feed-box K. The feed-cylinders M are made in the form of small cylinders having diagonal or spiral teeth or corrugations upon their convex surfaces, as shown in Fig. 1, so that a following corrugation will begin to discharge its seed by the time the preceding corrugation becomes empty, and the discharge of seed will be continuous.

To one end of the feed-shaft L is attached a gear-wheel, O, into the teeth of which mesh the teeth of the intermediate gear-wheel, P. The teeth of the intermediate gear-wheel, P, also mesh into the teeth of a gear-wheel, Q, attached to the axle B, so that the feed-cylinders will be revolved from the said axle. The intermediate gear-wheel, P, is journaled to the upper part of the lever R, which is pivoted, at a little distance from its lower end, to a side bar of the frame C. The intermediate gear-wheel, P, is held in gear with the gear-wheels O Q by a spring, S, one end of which is attached to the lower end of the lever R, and its other end is connected with the frame C by a hook, T, or other suitable connection.

To the upper end of the lever R is attached the end of the short chain U, the other end of which is attached to the lever V. The lower end of the lever V is pivoted to a side bar of the frame C, and its upper part projects across a curved catch-bar, W, formed upon or attached to a standard, X, the lower end of which is attached to a side bar of the frame C. The lever V is kept near the catch-bar W by a guard-bar, Y, the ends of which are attached to the ends of the said catch-bar W. By this construction the intermediate gear-wheel, P, can be thrown out of and into gear with the gear-wheels O Q by operating the lever V.

To the lever V is pivoted the outer end of a connecting-bar, Z, the inner part of which passes through a guide-keeper, $a$, attached to the side bar of the frame C.

To the forward end of the connecting-bar Z is attached the end of a cord, chain, or strap, $b$, which passes over a guide-pulley, $c$, pivoted to the side bar of the frame C. The strap $b$ passes around the lower side of the pulley $d$, and is attached to the forward side of the said pulley. The pulley $d$ is rigidly attached to the end of the shaft $e$, which is journaled at its ends to the forward parts of the side bars of the frame C.

To the forward side of the shaft $e$ are attached as many sets of two or three lugs, $f$, as there are discharge-openings in the seed-box E. To the lugs $f$ of each set is hinged the correspondingly-forked forward end of a bar, $g$, the rear end of which is rigidly attached to lugs $h$, formed upon or attached to the forward side of the boot $i$. The boots $i$ are flattened longitudinally, so that all the boots of the machine can stand side by side in a single row.

Upon one of the lugs $f$ of each set is formed a projection, $j$, which, when the shaft $e$ is turned by operating the lever V, engages with a projection, $k$, formed upon the forward part of the bar $g$, and raises the said bar $g$ and the boot $i$ connected with it above the ground, for convenience in turning around and in passing from place to place. In the open upper end of the boot $i$ is placed the lower end of the flexible discharge-spout N, to conduct the seed from the feed-box K to the said boot $i$. Through the forward part of the lower end of the boot $i$ is passed a square bolt, $l$, the ends of which project, and are rounded to serve as journals for the rotary cutters $m$, which are set with their forward sides inclined inward, so as to nearly meet, as shown in Fig. 5, so that the said cutters $m$, as the machine is drawn forward, will open a furrow to receive the seed, which drops from the lower end of the boot $i$ between the rear parts of the said cutters into the said furrow, and is covered by the falling in of the soil at the rear of the said cutters as the machine is drawn forward.

Upon the ends of the bolt $l$, at the outer sides of the cutters $m$, are placed the lower ends of scrapers $n$, which are secured in place by nuts screwed upon the ends of the bolt $l$. The scrapers $n$ rest against the upper parts of the cutters $m$, and their upper ends are bolted to the rear part of the bar $g$.

To the rear side of the boot $i$ are attached, or upon it are formed, two or more lugs, $o$, to which is hinged the correspondingly-forked forward end of the bar $p$, so that the rear end of the said bar will have a free vertical movement. The rear end of the bar $p$ is slotted horizontally to form two or more prongs, to which is hinged the correspondingly-slotted forward end of the bar $q$, so that the rear end of the said bar $q$ will have a free lateral movement.

To the slotted rear end of the bar $q$ is journaled the wheel $r$, which follows the furrow opened by the cutters $m$ and presses the soil down upon the seed.

To the forward part of the bar $q$ is attached the lower end of the bar $s$, which is curved to the rearward, and to its upper end, at the top of the wheel $r$, is attached, or upon it is formed, a scraper, $t$, to remove any soil that may adhere to the rim of the said wheel.

To the rear cross-bar of the frame C is attached a fork, $u$, the prongs of which pass down upon the opposite sides of the rear part of the bar $q$, and serve as guides to the plate $v$, attached to the lower end of the spring $w$, and which is recessed upon the opposite edges to receive the prongs of the fork $u$. The spring $w$ is designed to hold the wheel $r$ down to its work with the necessary pressure. With this construction the wheels $r$ can turn to one side to allow the machine to be turned in a small space, and the wheels $r$ and boots $i$ can have a vertical play, to allow them to adapt themselves to the uneven surface of the ground.

In the lower prong of the rear end of the bar $p$ is formed a recess to receive a pin, $x$, attached to the lower prong of the bar $q$ to limit the lateral movement of the side bar, $q$, and wheel $r$.

From hinges or other supports attached to the forward side of the seed-box E is suspended a grass-seed box, $y$, which is made with discharge-holes in its bottom, and is provided with a sliding bottom, $z$, operated by an adjusting-bar, 1, having a locking-screw, 2. The seed-box $y$ is also provided with a false bottom, 3, having hopper-shaped discharge-openings to allow the seed to come in contact with the spirally-corrugated feed cylinders 4, placed beneath the said false bottom 3, and attached to a shaft, 5, revolving in bearings in the ends of the seed-box $y$.

To one of the ends of the feed-shaft $y$ is detachably secured a small gear-wheel, 6, by a set-screw, 7, so that the said gear-wheel can be readily detached when the grass-seed box $y$ is not required for use.

Beneath the perforated bottom of the grass-seed box $y$ is placed a bar, 8, the end of which, or arms 9, formed upon or attached to the said ends, extend upward, and are pivoted to the ends of the said seed-box $y$.

To the axle B is attached a wheel, 10, the edge of which meshes into the teeth of a gear-wheel, 11. In the edge of the wheel 10 is formed a slit, 12, having its edges bent in opposite directions, so as to be parallel with each other, and at such a distance apart that the said wheel at each revolution will pass from one tooth to the next one of the wheel 11, and thus revolve the said wheel 11 through the space of one tooth at each revolution of the said wheel 10. The gear-wheel 11 is connected with a set of gear-wheels, 13, each succeeding one of which is designed to be revolved through the space of one tooth by the revolution of the preceding wheel, and the last wheel of the set is provided with a pointer, 14, which moves along a circular scale of division-marks on the casing 15, that incloses the said gear-wheels 11 13, so as to show the number of revolutions made by the drive-wheel A, and thus show the distance traveled by the machine.

Having thus described my invention, what I claim as new, and desire to secure by Letters Patent, is—

1. In a grain-drill, the combination, with the feed-shaft and its gear-wheel, of the lever R, pivoted near its lower end to the frame, as shown, spring S, for throwing the lever forward, pinion P at the upper end of the lever, pivoted lever V, chain U, connected to said lever and to the lever R, connecting-bar Z, pivoted to the lower end of the lever V, pivoted bar $e$, provided with pulley $d$, cord $b$, connected to the end of connecting-bar Z, passing over pulley $c$, under pulley $d$, to its front side, and there firmly secured, and bars $g$, connected to the bar $e$ and to the boots $i$, substantially as set forth.

2. In a grain-drill, the combination of the laterally-jointed bars $p$ $q$, connecting the covering-wheels $r$ with the boots $i$, with the forked guide-arms $u$, for guiding the said bars, plates $v$ above the bars, and springs $w$, bearing on the plates to press the bars and wheels $r$ downward, substantially as set forth.

3. The boots $i$, provided with square bolts $l$, passing through the lower forward ends thereof, and having extensions on opposite sides of said boots, converging cutters $m$, journaled on said extended parts of the bolts, scrapers $n$, secured at their lower ends to said extended parts of the bolts, and there held by nuts, and extending upward and secured to the bars to which the boots are secured, all combined and arranged substantially as set forth.

SAMUEL HOWARD KOBLE.

Witnesses:
JOHN H. WILSON,
THOMAS L. NOLAND.